(No Model.)
F. KEES.
CORNER STRIP.
No. 529,500. Patented Nov. 20, 1894.
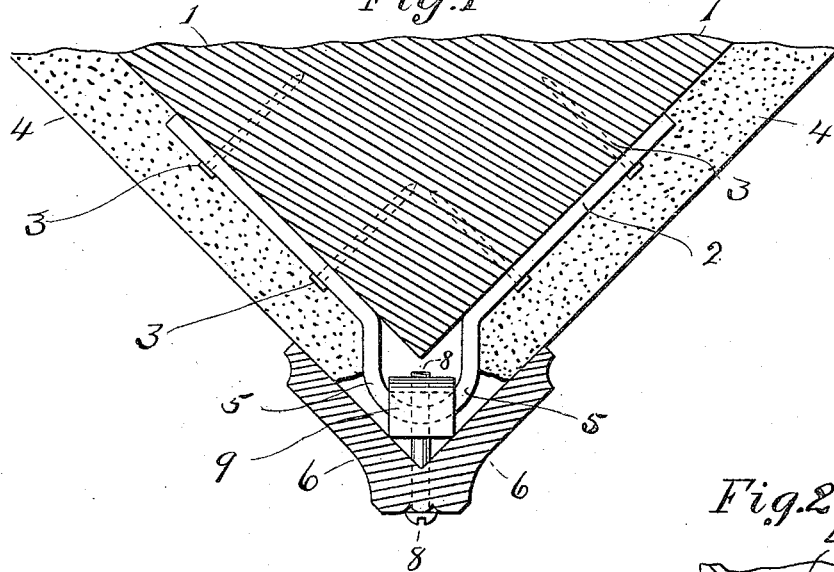
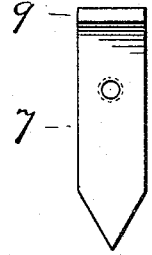
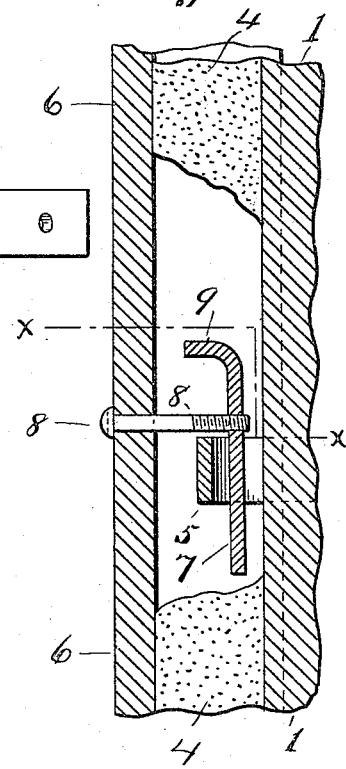
Witnesses
C. H. Hill
R. Blum
Inventor
Frederick Kees
By P. H. Gunkel
his Attorney.

UNITED STATES PATENT OFFICE.

FREDERICK KEES, OF MINNEAPOLIS, MINNESOTA, ASSIGNOR OF ONE-HALF TO FRANK B. LONG, OF SAME PLACE.

CORNER-STRIP.

SPECIFICATION forming part of Letters Patent No. 529,500, dated November 20, 1894.

Application filed March 16, 1894. Serial No. 503,834. (No model.)

*To all whom it may concern:*

Be it known that I, FREDERICK KEES, a citizen of the United States, residing at Minneapolis, in the county of Hennepin and State of Minnesota, have invented a certain new and useful Improvement in Corner-Strips, of which the following is a specification.

My invention relates to means for fastening strips or angle-staffs on the salient angles of plastered surfaces in the interiors of buildings; and is an improvement upon the devices shown in my Patent No. 448,187, of March 10, 1891. It is matter of common knowledge that with the use of ordinary angle-staffs secured on the angles of plastered surfaces by nails or screws it is difficult to fasten them securely and when once fastened it is still more difficult to remove and replace them so as to make them secure when in place. It was the object of the improvements set forth in my prior patent referred to, to overcome this difficulty and the devices used consisted of a bracket having a projecting portion provided with a slot through which was passed a bolt having an angular nut in the interior of the slot bearing against shoulders, so that when the bolt, which extended through the corner strip, was tightened the strip was drawn securely against the plastered corner; and while such devices were found to be operative, it required considerable care in adjusting the nuts so that they would properly enter the slots, and further difficulty in keeping them tight against the shoulders of the brackets so as to avoid the slipping of the angle-staff by gravity. These objections are entirely overcome by my present improvements, which are illustrated in the accompanying drawings, and in which—

Figure 1, shows in horizontal section a portion of the salient angle of a plastered wall provided with the devices of my improvement, the same being shown on the angular line *x—x* of Fig. 2. Fig. 2, is a central vertical section of Fig. 1. Fig. 3 shows the bracket in detail; and Fig. 4 the hook or tongue used in the improvements.

In such drawings 1 designates a projecting angle of a wall to be plastered; and 2 a bracket permanently attached to the wall by nails or screws 3 and embracing the angle; and 4 the plaster laid on after the bracket 2 has been secured in place. The bracket has an outward loop or extension 5, which is left exposed and which is within the planes of the outer surfaces of the plaster, as plainly indicated in Fig. 1.

The angle-staff, or strip, 6, is provided with a hook or tongue 7 that is connected with it and carried by means of a screw 8, the head of the screw bearing against the exterior of the strip and its threaded portion engaging a tapped hole in the hook; whereby, by the turning of the screw 8 the hook 7 may be brought to contact with the loop 5 of the bracket and tightened so as to hold the angle-staff in place. These devices may be provided in any desired number and at suitable intervals in the length of an angle-staff so that it may be firmly held in place. In using these devices the staff is applied with the lower points of the hooks above the loops 5 and lowered to the desired position and held in place manually while one or more of the screws 8 are tightened. The tightening of the screws, as will be apparent from Fig. 1, will cause the outer edges of the vertical portions of the hooks to bear against the inner edges of the loops 5, thus binding the staff against the plastered surfaces by clamping the hooks against the loops. The lateral portions 9 of the hooks, by contact with the side walls of the angle-staff, prevent them from turning while the screws are being operated. It will be apparent that the staff may be placed and secured in any position within the limit of the length of the contact surfaces of the hooks with the loops. This construction will be found more convenient and much more readily operated than the devices of my patent referred to, while serving an analogous purpose.

Having described my invention, what I claim is—

The combination, with a corner to be plastered, and a device providing an exposed loop, of a corner-strip provided with a hook or tongue, and means for drawing the latter against the loop to bind the strip against the plastered surfaces, substantially as set forth.

FREDERICK KEES.

Witnesses:
RENZY BLUME,
P. H. GUNCKEL.